US009804586B2

(12) United States Patent
Fioravanti et al.

(10) Patent No.: US 9,804,586 B2
(45) Date of Patent: Oct. 31, 2017

(54) METHOD FOR POWDERED DRUG RECONSTITUTION

(71) Applicant: HEALTH ROBOTICS S.R.L., Bolzano (IT)

(72) Inventors: Fabio Fioravanti, Trieste (IT); Walter Bianco, Trieste (IT); Sasa Marinkovic, Trieste (IT); Gabriele Kucich, Trieste (IT)

(73) Assignee: Aesynt Topco B.V., Amsterdam (NL)

( * ) Notice: Subject to any disclaimer, the term of this patent is extended or adjusted under 35 U.S.C. 154(b) by 609 days.

(21) Appl. No.: 14/362,192

(22) PCT Filed: Dec. 3, 2012

(86) PCT No.: PCT/IB2012/056926
§ 371 (c)(1),
(2) Date: Jun. 2, 2014

(87) PCT Pub. No.: WO2013/080190
PCT Pub. Date: Jun. 6, 2013

(65) Prior Publication Data

US 2014/0358272 A1 Dec. 4, 2014

Related U.S. Application Data

(60) Provisional application No. 61/566,255, filed on Dec. 2, 2011.

(51) Int. Cl.
*G06F 19/00* (2011.01)
*G05B 19/4155* (2006.01)
(Continued)

(52) U.S. Cl.
CPC ............ *G05B 19/4155* (2013.01); *A61J 3/00* (2013.01); *B01F 1/00* (2013.01); *B01F 1/0005* (2013.01);
(Continued)

(58) Field of Classification Search
USPC ........................................................ 700/117
See application file for complete search history.

(56) References Cited

U.S. PATENT DOCUMENTS 2,086,241 A * 7/1937 Schaerr ............... B01F 11/0022 366/212
5,431,201 A * 7/1995 Torchia ..................... A61J 1/20 141/100
(Continued)

FOREIGN PATENT DOCUMENTS

JP H0751385 2/1995
JP 2001310285 11/2001
(Continued)

OTHER PUBLICATIONS

"*Commande des robots manipulateurs*", C. Reboullet O.N.E.R.A Centre d'Etudes et de Recherches de Toulouse Edition 1992, Chapitre 1, English translation of p. 9.
(Continued)

*Primary Examiner* — Ziaul Karim
(74) *Attorney, Agent, or Firm* — McCarter & English, LLP

(57) ABSTRACT

Method of robot control is disclosed that includes the steps of: providing a user interface for introducing data indicative of a drug to be subjected to a reconstitution process; accessing an internal data base for outputting, for a selected drug, a list of primitive movements P1, P2, . . . Pi, . . . Pn to be used in the reconstructing process; operating the robot for executing sequentially the primitives and moving a container according to the instructions of the primitives; measuring, during the movement of the container under robot action, physical positions in the space and dynamic parameters of the container creating a list of registered data; comparing the measured positions in the space and the dynamic parameter with the corresponding ones of the
(Continued)

primitive movements for selecting a list of eligible primitives if a sufficient approximation level is reached; elaborating selected eligible primitives together to generate instructions for the robot allowing a complex movement encompassing the simple movements; and using the robot for shaking the container according to the complex movement.

6 Claims, 7 Drawing Sheets

(51) Int. Cl.

| | |
|---|---|
| ***B01F 11/00*** | (2006.01) |
| ***B01F 15/00*** | (2006.01) |
| ***B01F 1/00*** | (2006.01) |
| ***A61J 3/00*** | (2006.01) |

(52) U.S. Cl.

CPC ........ *B01F 1/0038* (2013.01); *B01F 11/0002* (2013.01); *B01F 11/0008* (2013.01); *B01F 11/008* (2013.01); *B01F 11/0014* (2013.01); *B01F 11/0025* (2013.01); *B01F 15/00318* (2013.01); *B01F 15/00746* (2013.01); *B01F 2215/0032* (2013.01); *Y10S 901/02* (2013.01)

(56) References Cited

U.S. PATENT DOCUMENTS

| | | | | |
|---|---|---|---|---|
| 6,915,823 | B2 * | 7/2005 | Osborne | B01F 13/1072 141/104 |
| 7,783,383 | B2 * | 8/2010 | Eliuk | A61J 1/20 141/1 |
| 2004/0261897 | A1 * | 12/2004 | Carlson | B01F 3/188 141/130 |
| 2006/0136095 | A1 | 6/2006 | Rob et al. | |
| 2006/0224321 | A1 * | 10/2006 | Lund | G01C 19/58 701/470 |
| 2006/0259195 | A1 * | 11/2006 | Eliuk | A61J 1/20 700/245 |
| 2008/0169043 | A1 * | 7/2008 | Osborne | A61J 1/20 141/1 |
| 2010/0198392 | A1 * | 8/2010 | Eliuk | A61J 1/20 700/216 |
| 2011/0088011 | A1 * | 4/2011 | Ouali | G06F 8/10 717/105 |
| 2011/0208350 | A1 * | 8/2011 | Eliuk | A61J 1/20 700/240 |
| 2013/0131865 | A1 * | 5/2013 | Yamane | B62D 57/032 700/254 |

FOREIGN PATENT DOCUMENTS

| | | |
|---|---|---|
| JP | 2005524457 | 8/2005 |
| JP | 2008525125 | 7/2008 |
| WO | WO 90/09776 | 9/1990 |
| WO | WO 9009776 | 9/1990 |
| WO | WO 2006/124211 | 11/2006 |
| WO | WO 2006124211 | 11/2006 |
| WO | WO/2013/080190 | 6/2013 |

OTHER PUBLICATIONS

"*Introduction to Robotics: Mechanics and Control, 3/E*", John J. Craig, Adept Technology, Inc., ISBN-10:0201543613, ISBN-13:978020154361297802015436120201543613, 2005. Prentice Hall Cloth, 408 pp, Published Jul. 27, 2004, pp. 252, 284-285, 344-351.

PCT International Search Report and Written Opinion for PCT/IB2012/056926 dated Mar. 28, 2013; 8 pages.

U.S. Appl. No. 61/566,255, filed Dec. 2, 2011.

* cited by examiner 1
2
9
6
5
4
3
22
H
20
DB.
10

16
16a
2
16b
17
15b
9
15
6
15a
3
12
10
13
Z
Y
X

METHOD FOR POWDERED DRUG RECONSTITUTION

TECHNICAL FIELD

The present invention relates to a system and method for powdered drug reconstitution.

BACKGROUND ART

As it is known, drugs are frequently stored in powdered form (lyophilized) because they rapidly lose their power once they are mixed into a solution. Powder drugs are typically used for parenteral administration, and in common language are often referred to as "powder for injection" (PI), "dry powder injection" or "powder for reconstitution." A wide sample list of dry powder for injection is available on the U.S. Pharmacopeia under USP 29-NF 24.

The above powdered drugs need to be mixed in a container (normally a vial) with a liquid generally referred to as "the diluents", i.e. reconstituted.

Once the diluents has been added to the powdered drug, the liquid-powder mixture needs to be agitated in the container until the drug powder is completely dissolved, i.e. the reconstitution process is terminated. For instance the USP defines the completeness of the reconstitution process as the status when no visible residue of undissolved powder is visible or the constituted solution is not significantly less clear than an equal volume of the diluents or purified water.

For most of the chemical drugs, no special handling and technique is described for achieving an efficient reconstitution, and in most of the cases effectiveness of the reconstitution only focuses on the effectiveness of the agitation, where the optimum procedure would be achieved by the agitation of the container that completely dissolves the drug in the shortest time.

Sometimes, commercially drugs are subject to limited instructions on how to perform agitation of the container, but these instructions are often vague and generic such as "gently swirl", or "avoid shaking." For most of the cases, in fact, the instructions are provided to prevent foaming or gel formation in the reconstituted drug or in any case to limit overpressure in the container that could subsequently result into spray or aerosol effects when the container is opened.

More accurate instructions are normally not available, because the reconstitution process is performed by an operator, typically a pharmacy technician, handling and moving the container to be reconstituted; the result largely depends on individual skills and training of the operator and often is also conditioned by environmental constraints. In addition, when agitation needs to be carried out by an operator, no accurate agitation instructions could be implemented adequately, when reconstitution time could take from few seconds to minutes, as no operator would be in the condition to manually repeat a complex movement for such a long time.

For this reason, most of the research and solutions in the past years focused on the design of automated system for powdered drug reconstitution aiming at optimizing the agitation process, by achieving the best dissolution of the powdered drug in the shortest time.

Even though several automated systems for powdered drug reconstitution have been designed and are currently available on the market, only a limited number of degrees of freedom has been utilized so far to perform the agitation.

Systems available on the market perform the agitation by the following movements:

rotating the container around its longitudinal axis;

rotate the container vial around a central axis of a rotating disk where the container has their longitudinal axis parallel or inclined or even orthogonal to such rotation axis;

shaking container with variable frequency;

agitating the container through a roto-translational movement around two or three axes; and inducing a vortex within the diluents by means of a mixing tool immersed in the diluents.

None of the current system is suitable for the implementation of a complex agitation technique based on a combination of more than one movement, for example rotating the container around a vertical axis, then moving the longitudinal axis of the container on the surface of a cone and then gently shaking the container with close to zero velocity at the level of the vial stopper, and larger velocity at the bottom of the stopper.

A method for the reduced, controlled and repeatable reconstitution method for the effective dissolution of a powder drug is therefore needed here.

DISCLOSURE OF INVENTION

The present invention relates to a method of control of a robot used for a drug reconstitution operation as defined in claim 1.

BRIEF DESCRIPTION OF THE DRAWINGS

The invention will be described with reference to the enclosed drawings wherein.

FIGS. *3a*, *3b*, *3c* *3d* and *3e* show different operations according to the present invention.

BEST MODE FOR CARRYING OUT THE INVENTION

Figure 1:
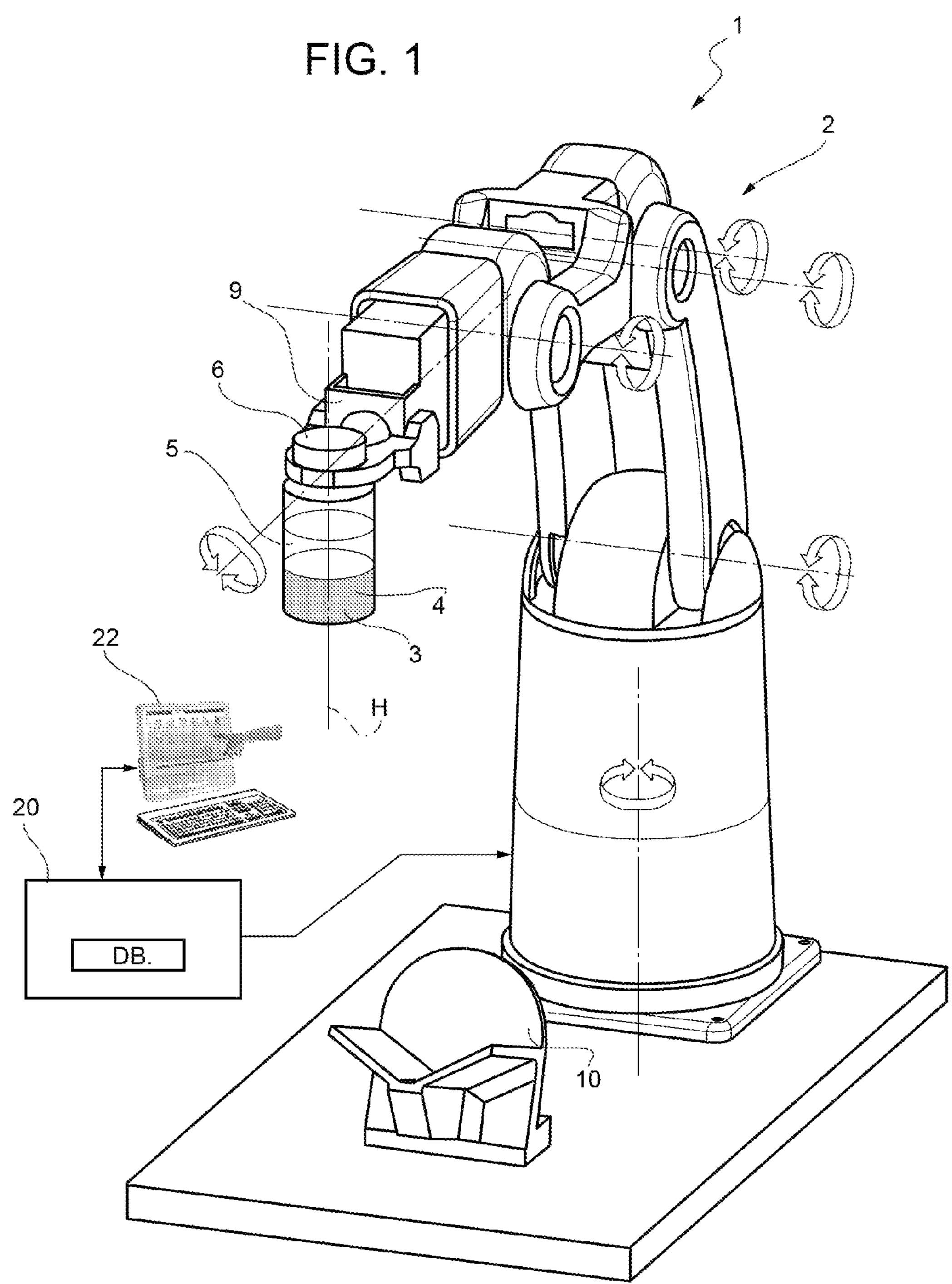
FIG. 1 shows in a simplified manner a system for a powdered drug reconstitution according to the present invention.

FIG. 1 shows a system used for a powdered drug reconstitution where a method of control of a robot according to the present invention is implemented.

The system 1 comprises a robot 2 (of known kind) designed to hold a container 3 (of a known kind, normally a vial) where a lyophilized drug 4 is mixed with a liquid 5 (the diluents) in the course of a reconstitution process.

The container 3 is elongated along one longitudinal axis H (in the example shown the container 3 has tubular cylindrical shape co-axial with axis H) and has an aperture closed by a cap 6 of known kind.

The container 3 is hold by a gripping—holding member 9 of robot 2; such a gripping—holding member is movable from a closed position (shown in the figures) where container 3 is stably hold by the gripping member 9 to an opening position (not shown) where the container is released into a socket 10 at the end of reconstitution operations.

In the example shown the robot 2 has six degrees of freedom (of course different robots may be used) and an comprises:

a lower portion 12 angularly movable around a first vertical axis A1 with respect to a base portion 13;

a first arm 15 having one end 15*a* connected in pivoting manner with the base portion 12 and angularly movable around a second horizontal axis A2;

a second arm 16 having a first end 16*a* connected to the second end 15*b* of arm 15 in a pivoting manner and angularly movable around a third horizontal axis A3;

one head 17 carried by a second end portion 16*b* of the arm 16 and movable around a fourth horizontal axis A4 with respect arm 16;

the gripping—holding member 9 that may rotate around a fifth axis with A5 respect head 17. The gripping—holding member 9 may also move along a sixth axis A6 with respect head 17.

The robot 2 communicates with a computerized unit 20 that controls the actuators (not shown) of the robot 3 for moving in the space with respect to a reference system X,Y,Z the container 3 according a trajectory whose definition will be explained in the following.

The movement of the container 3 is used to mix completely and satisfactory the lyophilized drug 4 with the liquid 5 in a reconstitution phase of the drug.

The computerized unit 20 has one (or more) internal data base DB whose use will be explained in the following.

The computerized unit has an user interface 22 (of known kind) that may comprise a keyboard, a mouse, a touch screen or other suitable means for inputting data and showing results.

Figure 2:
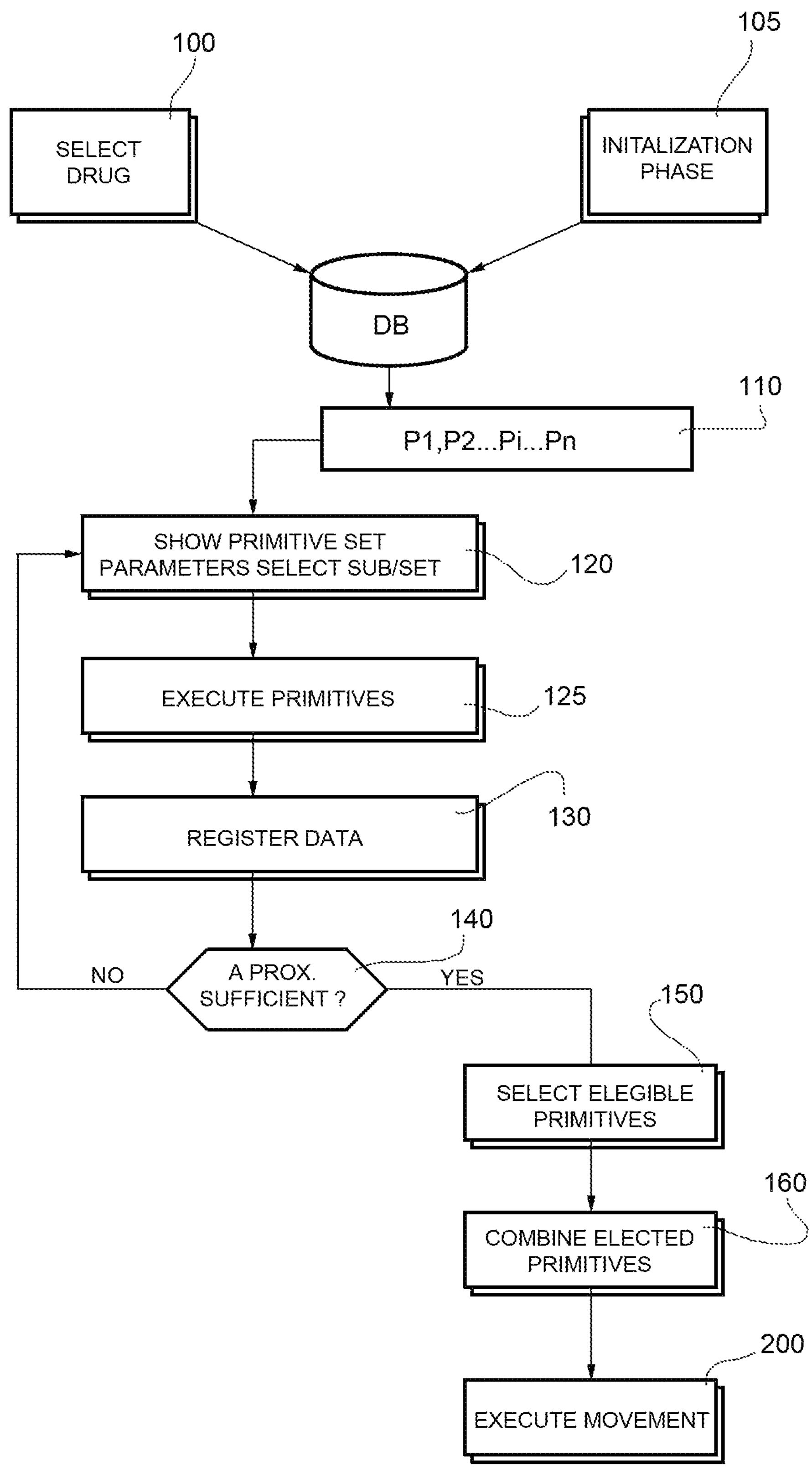
FIG. 2 shows operations of the system of the present invention.

The operation of the method of drug reconstruction according to the present invention are illustrated with reference to FIG. 2.

In a block 100 an operator, by means of a the use interface 22 (for instance the touch screen), introduces data indicative of the drug to be subject to reconstitution. For instance the commercial name of the drug may be introduced or the active composition of the drug may be introduced.

Based on the operator input, the system 1 accesses to the internal data base DB that outputs a list of primitive movements P1, P2, . . . Pi, . . . Pn to be used in the process of reconstructing the selected drug (block 110).

Each primitive movement mimics a movement made by an operator in a reconstruction phase and includes the computerized instruction for moving the container 3 by means of robot 2 according a pre-determined trajectory that, in the three dimensional space X,Y,Z, defines a predefined simple movement such as rotation, a translation according to one or two axis, a pendulum movement, etc.

Preferably the database DB may be configured to contain list of number of drugs, and for each listed stored drug respective movement primitives and movement constraints are associated.

| | | |
|---|---|---|
| Drug 1 | P1, P2 | Constraint 1 |
| Drug 2 | P2, P4 | Constraint 2 |
| Drug i | | |
| Drug n | | |

Figure 3A:
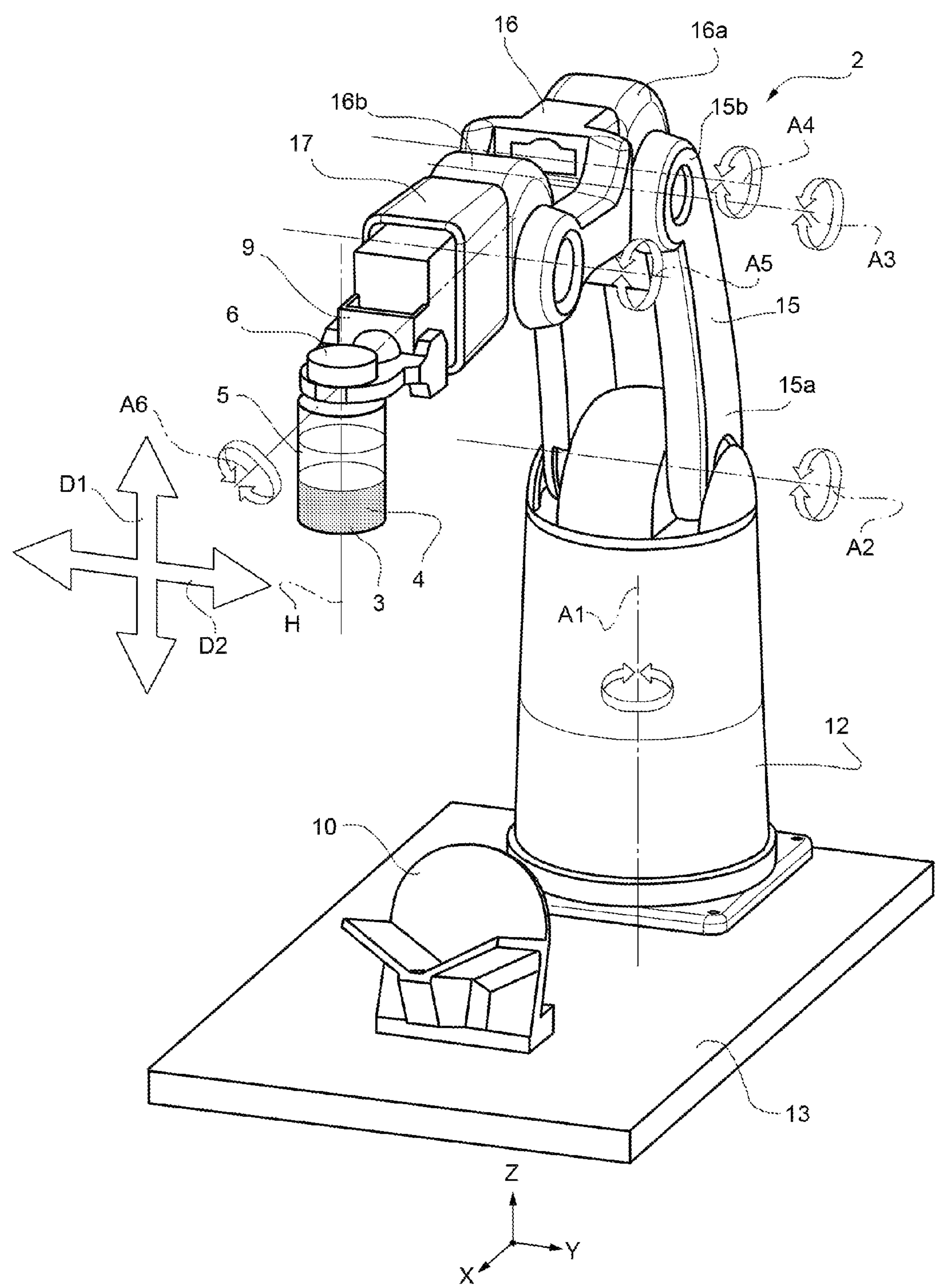

Non limiting examples of primitive movements are the following:

Primitive movement P1 (NONE) the elongated container 3 containing the drug is shacked by the robot 3 along a trajectory comprising first direction D1 parallel to its main axis H and a second direction D2 perpendicular to the first direction D1 without applying any further revolution/rotary movement to the container 3 during the above translation (see FIG. 3*a*).

Figure 3B:
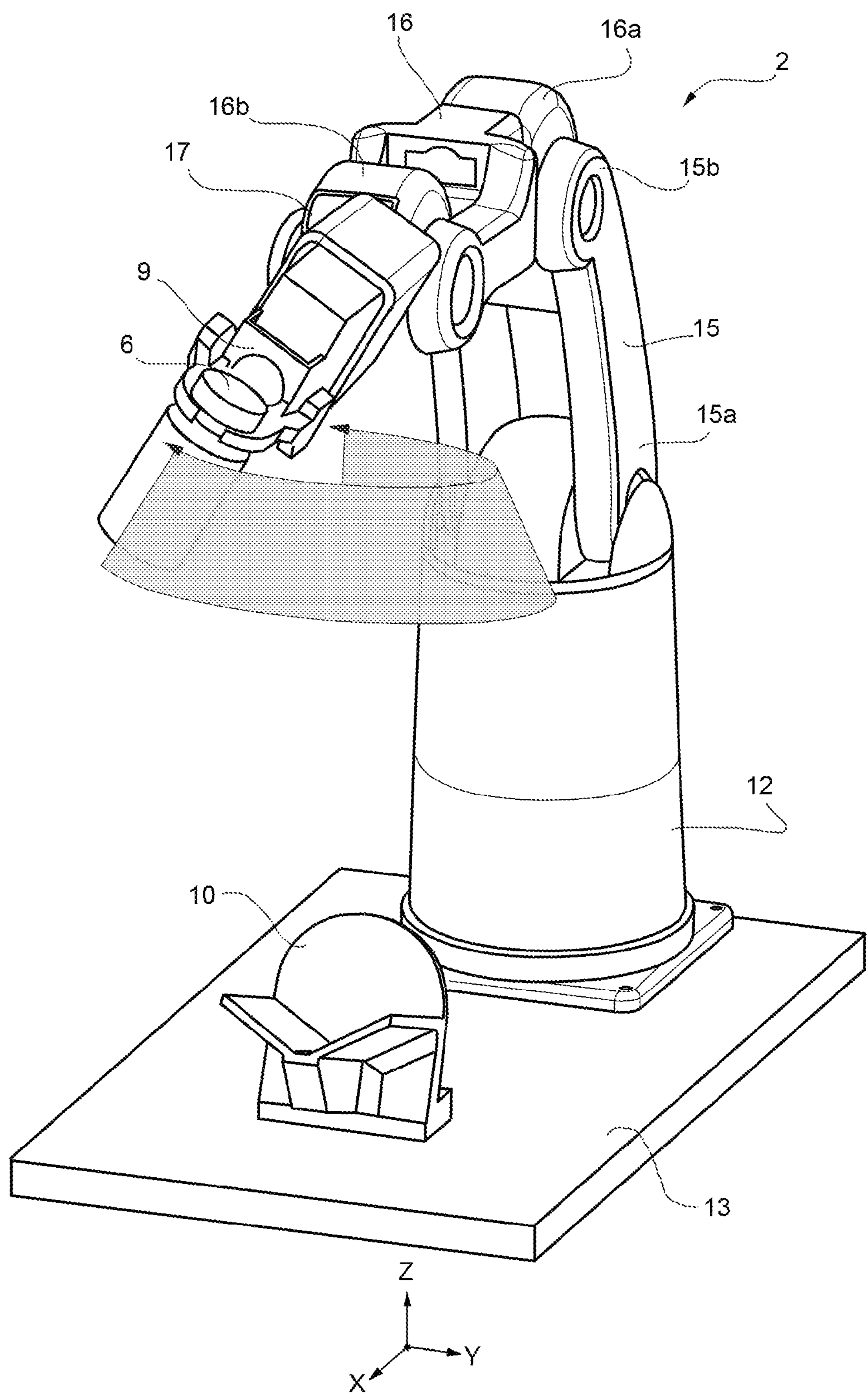
Figure 3C:
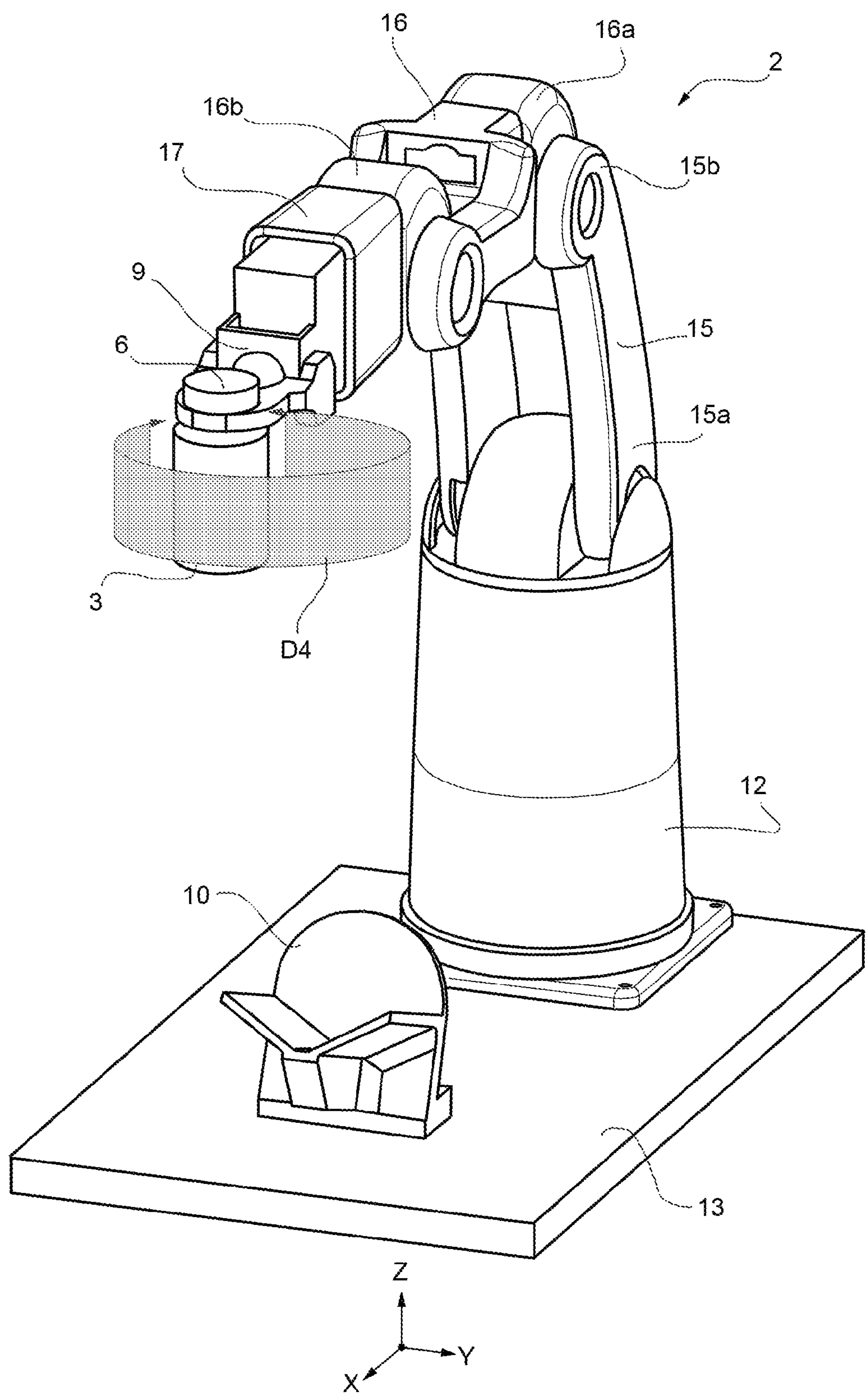
Figure 3D:
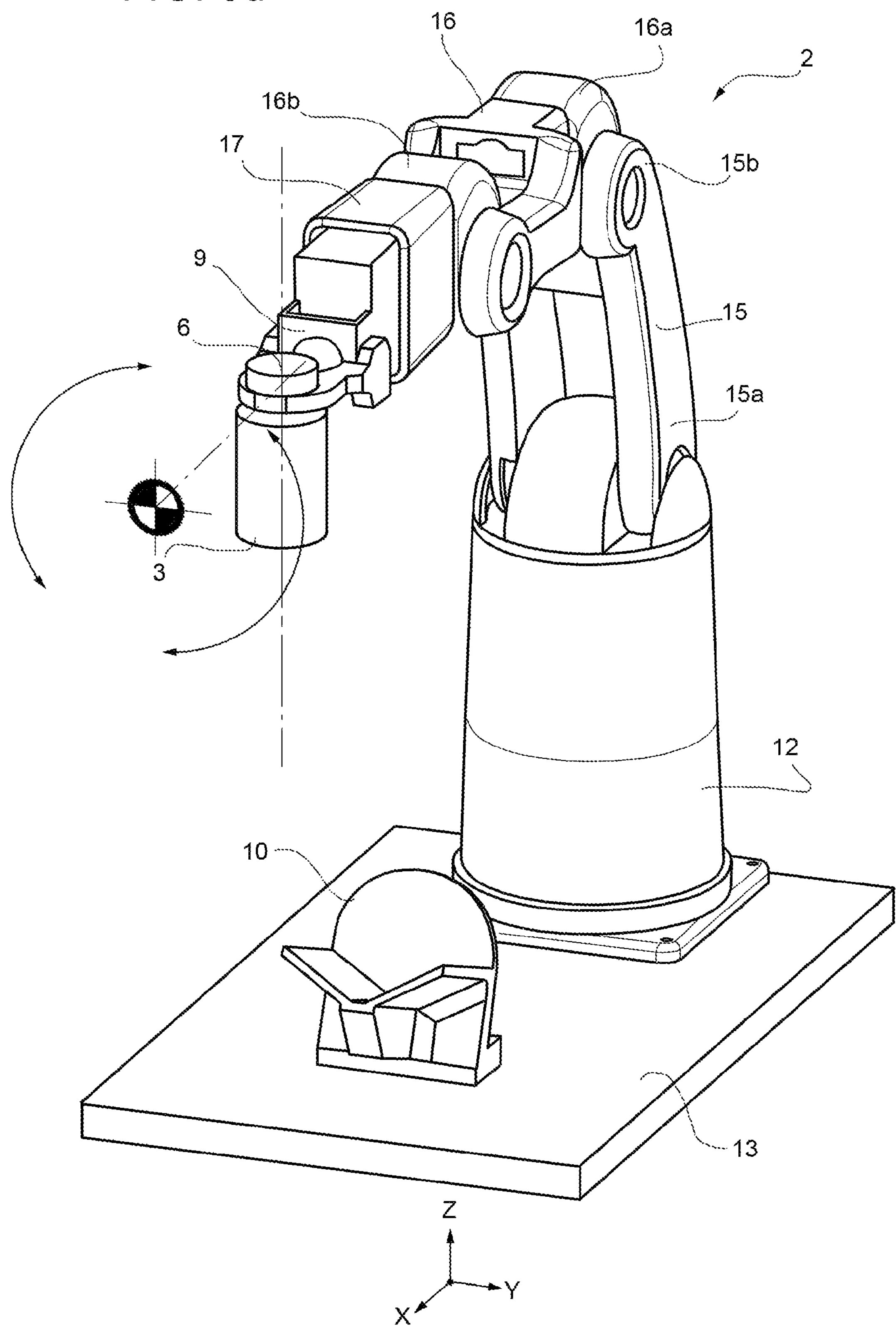
Figure 3E:
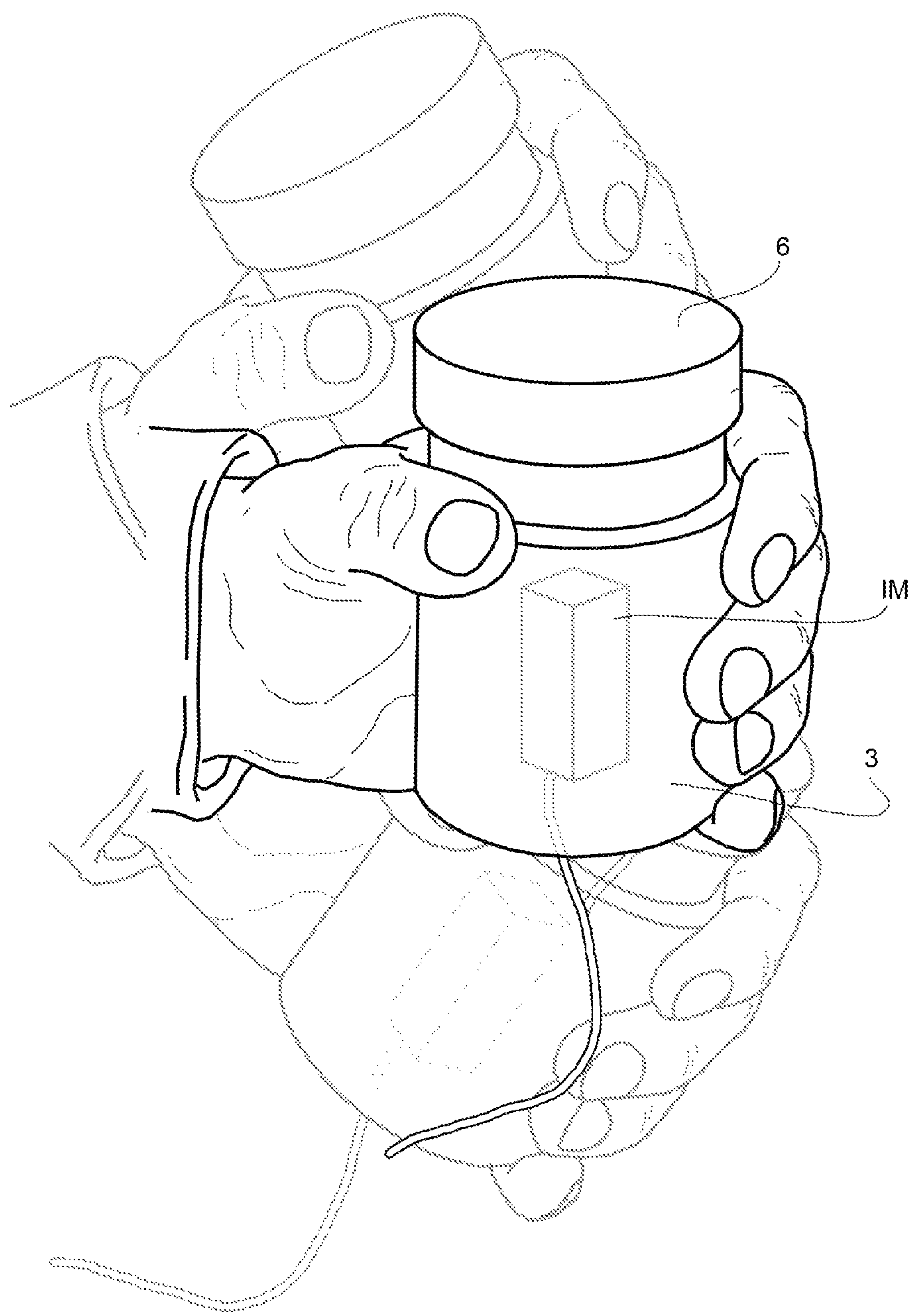

Primitive movement P2 (SWEEP_CONE): the axis H of the container moves along a trajectory D3 that rest on the surface of a cone (see FIG. 3*b*)—the angular speed of the rotating container 3 may be constant, sinusoidal or have saw tooth profile. The cone is swept entirely or limited to an arc (0°-360);

Primitive movement P3 (SWEEP_CYLINDER): the axis H of the container moves along a trajectory D4 that rests on the surface of a cylinder (see FIG. 3*c*)—the angular speed of the rotating container may be constant, sinusoidal or have saw tooth profile. The cone is swept entirely or limited to an arc (0°-360);

Primitive movement P4 (CUSTOM): the axis H of the container moves along a trajectory that rests on a parametric custom surface defined in the 3D space;

Primitive movement P5 (PENDULUM_AXIS): the axis H is subject to a pendular rotating movement around axis A5 on a variable plane (FIG. 3*d*). The container 3 may be subject to an angular speed that may be constant, sinusoidal or follow saw tooth profile. Rotation around the rotation axis of the robot can be limited to an arc) (0°-360°).

The primitive movements may be created in a setting phase (block 105) as follows.

In the setting phase inertial measuring means (shown schematically in FIG. 3) are coupled with the container 3 (the inertial measuring means of a know kind may comprise one accelerometer and/or one gyroscope having axes parallel to the H axis) that measure the movements of the container 3 that in manually moved by a trained operator that holds and shakes the container to effect a reconstitution phase according to a predetermined protocol.

The inertial measuring means measure angles, positions and accelerations that describe a three dimensional drug-reconstitution movement for the reconstitution of the drug. The above three dimensional drug-reconstitution movement is analyzed by means of a commercial software that extracts primitive movements that approximate the single movements that the operator has manually operated.

With regard to movement constraint the following examples are possible:

constraints indicative of limit positions that arms of robot parts 2 (arms for instance) or container 3 must not exceed perform during the reconstitution phase;

maximum speed values that parts of the robot 2 (arms for instance) or container 3 must not exceed, during the reconstitution phase;

maximum inclination angles that parts of the robot 2 (arms for instance) or container 3 must not exceed, during the reconstitution phase;

maximum acceleration values that parts of the robot 2 (arms for instance) or container 3 must not exceed, during the reconstitution phase. A list of the generated primitives for the drug of interest is shown on the interface 22 (block 120) so that the operator may select all the primitives or a sub set of primitives. The selection of the primitives may be effected by means of the touch screen 22 for instance.

Moreover for each selected primitive, the operator may define the kinematic parameters that are related the primitive in question. Example of kinematic parameters are:

position extremes, maximum speed values, maximum inclination angles, maximum acceleration values, etc. The robot 2 then sequentially executes the primitives that have been downloaded, i.e. moves the container 3 according to the instructions of the primitives (block 125).

During the movement of the container, the real and physical positions in the three dimensional space/dynamic parameters (accelerations/inclinations) of the container 3 are registered by means of an inertial measuring means IM that may be the same that has been used in the setting phase.

The registered positions (block 130) in the three dimensional space/dynamic parameter are compared (block 140) with the corresponding ones of the primitive movements that—as already explained—have been defined in a setting phase under manual reconstitution done by a trained operator.

The comparison may be effected by a suitable software that evaluates the differences (by means of a correlation function for instance) or the comparison may be directly operated by the operator, for instance by displaying relevant data of the primitives (block 150).

In other words the software or the operator may decide if the movements made automatically by the robot sufficiently approximate the movements that have been made manually by the trained operator.

If the approximation level is deemed sufficient, the operator selects a list of eligible primitives.

If the approximation level is deemed not sufficient, the operator may modify—in a re-setting phase—the kinematic parameter that have been previously set (from block 140 to block 120). Alternatively further primitives may be added.

If a re-setting phase is executed, the robot is again operated (block 125) and the above measuring, recording (block 130) and comparing (block 140) operation are repeated until the operator defines and selects a list of eligible primitives (exit from block 140, YES).

The selected eligible primitives are shown on the interface so that the operator may combine them and generate the final movement that is used for the reconstitution of the drug. Combining the eligible primitives involves at least one of the following actions:

a) setting the number of repetition of each primitive;

b) setting a possible contemporaneous execution of two or more primitives at the same time;

c) setting the pause between two adjacent primitives (i.e. the length of time during which the container is not moved);

d) setting the number of repetition of the whole list of primitives.

The above b) action produces a more complex movement that is obtained by combing (i.e. superimposing) the components of the movement under axes X,Y,Z. For instance if x1(t) e x2(t) represent the movements of two respective primitives Pi and Pi+1 along X axis x the more complex movement is a linear composition of x1(t) e x2(t).

The parameter of the final movement are stored.

Finally, the robot performs a reconstitution cycle by moving the container according the final complex movement (block 200).

Also in this case inertial measuring means may be applied to the container to register the movement that is physically effected by the robot 2. These recorded data may be presented on the interface for approval or revision purposes.

The invention claimed is:

1. A method for reconstitution of a pulverized drug, comprising the steps of:

providing a robot (2) having a movable element for carrying a container (3) elongated along one axis (H) and holding a pulverized drug (4) and diluents (5); said robot (2) being designed to agitate the container for enabling a reconstitution process wherein the pulverized drug is fully dissolved in the diluents;

providing a user interface (22) for introducing data indicative of the drug to be subjected to reconstitution process;

accessing an internal data base (DB) based on said introduced data for outputting, for a selected drug, a list of primitive movements P1, P2, . . . Pi, . . . Pn to be used in said reconstitution process; each primitive movements including the computerized instruction for the robot in order to move the container according to a predetermined trajectory that, in three dimensional space, defines a predefined simple movement that mimics a movement made under manual reconstitution;

operating the robot (2) for executing sequentially the primitive movements that have been outputted and moving the container (3) according to the instructions of the primitive movements;

measuring, during the movement of the container under robot action, physical positions in the space and dynamic parameters of the container (3) creating a list of registered data;

comparing the measured positions in the space and the dynamic parameter with the corresponding ones of the primitive movements for selecting a list of eligible primitive movements if a sufficient approximation level is reached;

combining selected eligible primitive movements together to generate instruction for the robot allowing a complex movement encompassing said simple movements;

using said robot (2) for shaking said container that is moved in the space according to said complex movement; and wherein the list of movements comprises two or more of the following movements:

Primitive movement P1 (NONE) in which the elongated container (3) containing the drug is shaken by the robot (2) along a trajectory comprising first direction D1 parallel to its main axis H and a second direction D2 perpendicular to the first direction D1 without applying any further revolution or rotary movement to the container (3) during the above translation;

Primitive movement P2 (SWEEPCONE) in which the axis H of the container moves along a trajectory that rest on a surface of a cone; and wherein an angular speed of the rotating container (3) chosen from the group consisting of constant, sinusoidal and saw tooth profile; the cone is swept entirely or limited to an arc;

Primitive movement P3 (SWEEPCYLINDER) in which the axis H of the container moves along a trajectory that rests on the surface of a cylinder, wherein an angular speed of the rotating container chosen from the consisting of constant, sinusoidal and a saw tooth profile; and wherein the cone is swept entirely or limited to an arc;

Primitive movement P4 (CUSTOM) in which the axis H of the container moves along a trajectory that rests on a parametric custom surface defined in the three dimensional (3D) space;

Primitive movement P5 (PENDULUMAXIS) in which the axis H is subject to a pendular rotating movement on a variable plane; wherein the container (3) may be subject to an angular speed that chosen from the group consisting of constant, sinusoidal and a saw tooth profile; and wherein rotation around the rotation axis of the robot can be limited to an arc.

2. The method according to claim 1, wherein said data base (DB) provides a list of constraints for each primitive movement.

3. The method according to claim 1, further comprising the steps of: defining a plurality of kinematic parameters that are related to any selected primitive movements before operating the robot (2) for sequentially executing the primitive movements;

modifying said kinematic parameters if the approximation level is not reached; and operating the robot for executing the primitive movements with updated kinematic parameters.

4. The method according to claim 2, wherein the constraints comprise at least one of the following:

constraints indicative of limit positions of portions of the robot (2) or container during the reconstitution phase;

maximum speed values of portions of the robot (2) or container (3) during the reconstitution phase;

maximum inclination angles of portions of the robot (2) or container (3) during the reconstitution phase;

maximum acceleration values of portions of the robot (2) or container (3) during the reconstitution phase.

5. The method according to claim 1, wherein the primitive movements are created in a setting phase wherein:

inertial measuring means (IM) are coupled with the container (3) to measure the movements of the container (3) while an operator manually holds and shakes the container to effect a reconstitution phase according to a predetermined protocol;

said inertial measuring means measures positions and dynamic parameters that describe a three dimensional drug-reconstitution movement for the reconstitution of the drug;

said three dimensional drug-reconstitution movement is analyzed to extract primitive movements that approximate the single movements that the operator has manually operated.

6. The method according to claim 1, wherein the step of combining eligible primitive movements involves at least one of the following actions:

a) setting a number of repetitions of each primitive movements;

b) setting a contemporaneous execution of two or more primitive movements at the same time;

c) setting a pause between two adjacent primitive movements;

d) setting a number of repetitions of the whole list of primitive movements.

* * * * *